United States Patent [19]
Pressman et al.

[11] 3,873,715
[45] Mar. 25, 1975

[54] THERAPEUTIC AGENT FOR IMPROVING CARDIOVASCULAR FUNCTION

[75] Inventors: Berton Charles Pressman, Coral Gables; Norberto Tumali de Guzman, Miami Beach, both of Fla.

[73] Assignee: University of Miami

[22] Filed: Apr. 6, 1973

[21] Appl. No.: 348,809

[52] U.S. Cl. .............................................. 424/283
[51] Int. Cl. ........................................... A61k 21/00
[58] Field of Search ................................... 424/283

[56] References Cited
UNITED STATES PATENTS
3,715,372   2/1973   Stempel et al. ..................... 424/283

OTHER PUBLICATIONS
Stempel — Chem. Abst. Vol. 75 (1971) page 117149V.

Primary Examiner—Sam Rosen
Attorney, Agent, or Firm—Samuel L. Welt; Jon S. Saxe; Gerald S. Rosen

[57] ABSTRACT

Methods of and compositions for a therapeutic agent for improving cardiovascular function utilizing as the active agent a compound represented by the formula

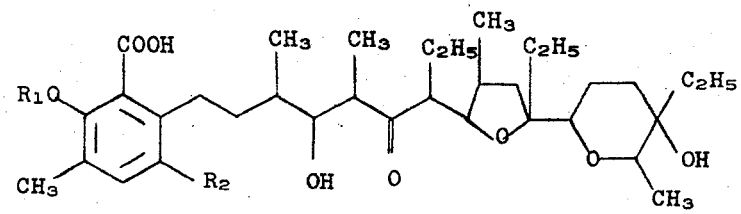

wherein $R_1$ is hydrogen or acetyl; $R_2$ is hydrogen, bromine or chlorine, and the pharmaceutically acceptable salts thereof, are disclosed.

10 Claims, No Drawings

A THERAPEUTIC AGENT FOR IMPROVING CARDIOVASCULAR FUNCTION

DESCRIPTION OF THE INVENTION

The invention described herein was made in the course of work under a grant or award from the Department of Health, Education, and Welfare.

Antibiotic X-537A and various derivatives of antibiotic X-537A are known to possess coccidiostatic and antibacterial properties. We have discovered that antibiotic X-537A and some of its derivatives possess cardiovascular effects in mammals. More particularly, we have discovered that the compounds cause a myocardial stimulation.

Antibiotic X-537A is a designation given to a crystalline antibiotic produced by a Streptomyces organism isolated from a sample of soil collected at Hyde Park, Massachusetts. Lyophilized tubes of the culture bearing the laboratory designation X-537 were deposited with the United States Department of Agriculture, Agriculture Research Service, Northern Utilization Research and Development Division, Peoria, Ill. The culture given identification number NRRL 3382 by the Agricultural Research Service, has been made available to the public through NRRL. The culture is also available to the public from the International Center of Information in collaboration with W.H.O. in Belgium.

The antibiotic material, heretofore identified as antibiotic X-537A, upon laboratory analysis has been found to be 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}-salicylic acid, i.e., a compound represented by the formula

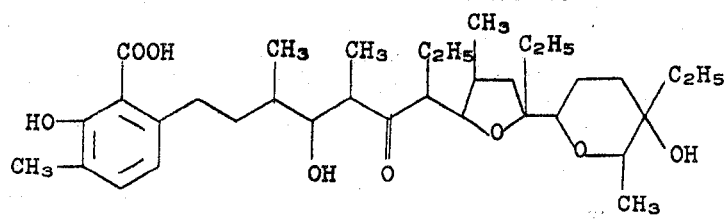

Antibiotic X-537A is prepared by growing the Streptomyces organism in an aerated submerged culture, with the pH of the broth adjusted to about neutral, i.e., about 6.5 to 7.5. The medium utilized contains a nitrogen source such as yeast, a yeast derived product, corn meal, bean meal and the like, with soybean meal being the most preferred; and a carbohydrate source, such as sugar, molasses and the like, with brown sugar being most preferred. The fermentation is carried out at slightly elevated temperatures, i.e., between about 25°C. and 35°C., with the preferred incubation temperature being about 28°C. After an incubation of about 4 to 6 days, the fermentation broth is filtered and the antibiotic recovered by extraction.

The active compounds of this invention include those represented by the formula

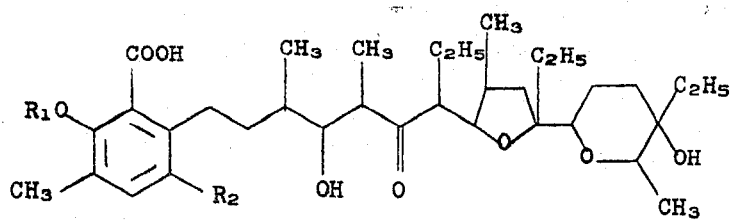

wherein $R_1$ is hydrogen or acetyl; $R_2$ is hydrogen, bromine or chlorine, and the pharmaceutically acceptable salts thereof.

Representative of the active compounds useful in this invention are 3-methyl-6-{7-ethyl-4-hydroxy-3,5-dimethyl-6-oxo-7-[5-ethyl-3-methyl-5(5-ethyl-5-hydroxy-6-methyl-2-tetrahydropyranyl)-2-tetrahydrofuryl]heptyl}salicylic acid (crystalline antibiotic X-537A);

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid, sodium salt;

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt;

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

The most significant desired criteria for chemical compounds used to treat chronic heart conditions, such as congestive heart failure, or emergency heart conditions, e.g., shock, heart failure, are that the compound should have a positive inotropic effect with little or no chronotropic effects and display minimal, if any, adrenergic action. Other desirable criteria are that the compounds have a rapid onset of action, require a small effective dose, are non-toxic at the effective doses, display a satisfactory duration of action, display a return to the original pre-drug values of cardiovascular activity, and continued identical responses to subsequently repeated identical doses. It is also desirable that such compounds be amenable to oral or parenteral administration. The oral administration is particularly preferred for long term treatment of chronic diseases, e.g. congestive heart failure, while parenteral administration is the choice for emergency treatment, e.g., shock, acute heart failure.

The active compounds of this invention fulfill the desired criteria and are thus useful for stimulation of cardiovascular functions and treating such ailments as cardiogenic shock, septic shock and congestive heart failure.

The active compounds useful in this invention form a variety of pharmaceutically acceptable salts. These salts are prepared from the free acid by methods well known in the art, for example, by washing the free acid in solution with a suitable base or salt. Examples of such pharmaceutically acceptable basic substances capable of forming salts for the purpose of the present invention include alkali metal bases, such as sodium hydroxide, potassium hydroxide, lithium hydroxide and the like; alkaline earth metal bases, such as calcium hydroxide, barium hydroxide and the like; and ammonium hydroxide. Alkali metal or alkaline earth metal salts suitable for forming pharmaceutically acceptable salts can include anions such as carbonates, bicarbonate and sulfates. Preferred for use in this invention are salts formed from alkali metal bases.

The specific compounds useful in this invention are known compounds and their preparation is disclosed in U.S. Pat. No. 3,715,372.

Thus, compounds wherein $R_1$ is acetyl can be prepared from compounds wherein $R_1$ is hydrogen by using conventional acetylating agents such as acetic anhydride or acetyl chloride.

Compounds wherein $R_2$ is chlorine or bromine can be prepared from compounds in which $R_2$ is hydrogen by any conveniently available halogenating technique, e.g., bromination with bromine or chlorination with chlorine.

For use as cardiovascular agents, the active agents are formulated, using conventional inert pharmaceutical adjuvant materials, into dosage forms which are suitable for oral or parenteral administration. Such dosage forms include tablets, suspensions, solutions, hard or soft capsules, dragees and the like. The identity of the inert adjuvant materials which are used in formulating the active compounds into oral and parenteral dosage forms will be immediately apparent to persons skilled in the art. These adjuvant materials, either inorganic or organic in nature, include, for example, water, dimethylsulfoxide, gelatin albumin, lactose, starch, magnesium stearate, preservatives, stabilizers, wetting agents, emulsifying agents, salts for altering osmotic pressure, buffers, etc. which can be incorporated, if desired, into such formulations.

The quantity of active agent which is present in any of the above described dosage forms generally varies from 10 to 25 mg. per unit dosage. The dosage administered to a particular patient is variable, depending upon the clinician's judgment using as the criteria the condition and size of the patient, the potency of the active agent and the patient's response thereto. An effective dosage amount of active agent can therefore only be determined by the clinician utilizing his best judgment on the patient's behalf.

Generally, parenteral doses should be from about 20 mg. to about 50 mg. for the average size man. Smaller persons or larger persons require adjustments due to size. Oral doses, usually capsules, but tablets can be used, generally are about twice the parenteral dose.

The frequency of the dose would depend upon the patient's condition. Chronically ill patients may require administration every 2 to 3 hours or once a day, depending on the severity of the disease and the patient's response.

Emergency patients frequently need only one dose of active compound, particularly those in shock.

The cardiovascular effects of the agents are manifested by positive inotropic effects with minimal chronotropic effects. For example, normal female mongrel dogs, weighing 30–35 lbs. were anesthetized with intravenous sodium pentobarbitol (20 mg./kg.) and artificially ventilated. Catheters were introduced through the femoral vessels to the left ventricular cavity, thoracic aorta and inferior vena cava for left ventricular and aortic pressures, and drug administration, respectively.

The derivative of the left ventricular pressure was obtained separately from a Statham micromanometer-tipped catheter. The derivative of pressure, dP/dt, was provided by an appropriate R-C differentiating circuit. The His bundle electrogram was obtained from a bipolar catheter positioned towards the medial cusp of the tricuspid valve. A Walton-Brodie strain gauge was sutured at the mid-portion of the right ventricular myocardium for recording the isometric ventricular segmental tension. This function was tranformed to its derivative (dT/dt) by an R-C differentiator. Cardiac output was obtained by the conventional dye dilution technique. The electrocardiogram was monitored from standard leads attached to the extremities of the dog. All parameters were recorded simultaneously and continuously by a multichannel photographic recorder.

The electrophysiological and hemodynamic responses of the dogs were measured at a time before, and at various time intervals after, an intravenous injection of 20 $\mu$moles of 3-methyl-6{7-ethyl-4-hydroxy-3,5-dimethyl-6-oxo-7-[5-ethyl-3-methyl-5(5-ethyl-5-hydroxy-6-methyl-2-tetrahydropyranyl)-2-tetrahydrofuryl]heptyl}salicylic acid (0.62 mg.kg.) administered as a $10^{-2}$ M solution in dimethylsulfoxide.

The results are shown for a representative dog in the following Table:

Example 8

Tablet Formulation

| | Per Tablet |
|---|---|
| 3-methyl-6- 7(R)-ethyl-4(S)-hydroxy-3(R), 5(S)-dimethyl-6-oxo-7-[5(S)-ethyl-3(S)-methyl-5(5(R)-ethyl-5-hydroxy-6(S)-methyl-2(R)-tetrahydropyranyl-2(S)-tetrahydrofuryl] heptyl salicylic acid | 25 mg. |
| Lactose | 113.5 mg. |
| Corn Starch | 55.5 mg. |
| Pregelatinized Corn Starch | 8 mg. |
| Calcium Stearate | 3 mg. |
| | 205 mg. |

Responses were measured ten minutes after injection of $2 \times 10^{-5}$ moles of the compound.

The results from six dogs indicated that the contractile force of the heart increased in the range of from 60% to 105% in six dogs; the rate of the tension development increased a mean of 65% and the rate of rise in blood pressure was a mean of 67%. Cardiac output increased a mean of 42% accompanied by an increase in stroke volume of 33%.

Mean arterial pressure was moderately elevated, 26%, and pulse pressure increased 28%. The onset of action of the active agent was rapid with a smooth continuous progression until maximum response in about 10–15 minutes. The effect lasted about 2 hours by which time the effects diminished until the monitored cardiovascular parameters returned to pre-drug values. Fresh doses thereafter elicited the same responses in the same dogs.

In contrast, no significant changes were observed in heart rate, atrio-His bundle, and His-bundle Purkinje conduction velocities and duration, and duration of the QRS interval, indicating minimal alteration of electrophysiological properties of the heart.

Significant changes in myocardial force of contraction, heart rate and blood pressure are caused by administration of the compounds. For example, in the following test:

3-methyl-6-(7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl acetyl salicylic acid;

nal of the "R" wave of lead 11. Femoral artery blood pressure was measured with a Statham pressure transducer. All drugs were dissolved in saline (0.9%) and administered rapidly as a single injection through a polyethylene catheter into the left femoral vein. Monitored parameters were recorded on two separate 2-channel Sanborn direct writing recorders.

The test compounds were evaluated for effects on heart rate, contractile force and mean arterial blood pressure. The results are set forth in the following Table.

Table II

| | Maximal Effective Dose (mg./kg.) i.v. | Time Post-Drug (min.) | Maximal Inotropic Responses (% Change/ Control) | Heart Rate (% Change/ Control) | Mean B.P. (% Change/ Control) |
|---|---|---|---|---|---|
| 3-methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}salicylic acid | 1.0 | 10 | +64 | +22 | +32 |
| 5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid | 2.0 | 15 | +29 | +4 | +2 |
| 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl acetyl}salicylic acid | 1.0 | 15 | +28 | +3 | +7 |
| 5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid | 4.0 | 20 | +88 | 0 | +57 |

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid;

3-methyl-6-{7(R)-ethyl-4-(S)-hydroxy-3(R)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}salicylic acid; and 5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl} salicylic acid in the form of their sodium salts were subjected to the following test in anesthetized dogs:

Four mongrel dogs of either sex, weighing 7 to 12 kg., were anesthetized with intravenously administered thiopental sodium (15 mg./kg.) and barbital sodium (275 mg./kg.). Each test dog was used as its own control. Each of the four test dogs received one drug.

During surgical manipulations, artifical respiration was maintained by intubation using a Bird respirator (Mark 8). Myocardial force of contraction was measured by opening the chest through the left 4th interspace and suturing a strain gauge arch to the surface of the right ventricle. The chest was then closed by suturing, pneumothorax was reduced, and spontaneous breathing permitted. Electrocardiograms were recorded using lead 11. Heart rates were recorded on a Sanborn cardiotachometer by using the electrical sig- The compounds are non-toxic within the effective dose range as evidenced by the $LD_{50}$ expressed in mg./kg. in animals. Thus, by oral administration the $LD_{50}$ of antibiotic X-537A is 40 mg./kg. in rabbits, 122 mg./kg. in rats and 146 mg./kg. in mice.

The following examples illustrate the invention.

EXAMPLE 1

3-methyl-6{7-ethyl-4-hydroxy-3,5-dimethyl-6-oxo-7-[5-ethyl-3-methyl-5(5-ethyl-5-hydroxy-6-methyl-2-tetrahydropyranyl)-2-tetrahydrofuryl]heptyl}salicylic acid (crystalline antibiotic X-537A)

The Streptomyces organism was grown in aerated submerged culture in shaken flasks. The pH of the broth was adjusted by the addition of KOH solution to 6.5–7.5, then the broth was sterilized. A tank fermentation was used wherein a 5–10% inoculum consisting of 3 day old submerged growth from aerated bottles was used in the tank. The medium contained 2% soybean flour, 2% brown sugar, 0.5 $K_2HPO_4$. The fermentation was carried out at 28°C., under positive air pressure, with air-flows of 5–10 cu. ft. of air per minute per 40 to 80 gallon liquid charge. The broth was harvested after 4 to 6 days fermentation, filtered, and the antibiotic was recovered by extraction. The extraction was carried out as follows:

204 Liters of broth were filtered and the wet filter cake was suspended in 100 liters of butyl acetate and mixture was stirred overnight, at room temperature.

The mixture was then filtered and the water layer was separated and discarded. The butyl acetate solution, assaying 30 million Bacillus E units, was concentrated in vacuo to 3 liters, washed with 10% sodium carbonate solution, and dried with anhydrous sodium sulfate.

On further concentration to 300 ml. and dilution with 350 ml. of petroleum ether (b.p. 50°–60°C.), 41 g. of solid material, assaying 25 million Bacillus E units, separated. This solid material was then extracted in a Soxhlet apparatus with 4 liters petroleum ether (b.p. 50°–60°C.) for 40 hours. The extract was taken to dryness in vacuo, the crystalline residue suspended in petroleum ether and filtered, yielding 24.49 g. of a mixture of the salt and free acid form of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid. The mother liquor of the solid yielded an additional 5.73 grams of the antibiotic.

After recrystallization from ether-petroleum ether, this material, which contained sodium was dissolved in ether and washed with dilute sulfuric acid to convert it to the free acid. Removal of the ether left an oily residue which crystallized from ethanol to yield pure 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid. Several recrystallizations from ethanol did not change the melting point which remained unsharp at 100°–109°C.

EXAMPLE 2

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl} salicylic acid, sodium salt To a solution of 1.53 g. of the sodium salt of antibiotic X-537A in 30 ml. carbon disulfide was added dropwise a solution of 0.14 ml. bromine 10 ml. carbon disulfide at −5° over 10 minutes. The solvent was removed under a stream of nitrogen at room temperature (approximately 2 hours). The residue was purified by dissolving it in ethyl acetate and the solution washed successively with aqueous sodium bisulfite and sodium carbonate. After drying (Na$_2$SO$_4$), the solution was evaporated under reduced-pressure and the residue crystallized from ethyl acetate to give 5-bromo-3-methyl-6- { ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid, sodium salt as colorless cubes, m.p. 185°, $[\alpha]_D^{25}$ −7.36° (1% in methanol).

EXAMPLE 3

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetylic salicylic acid, sodium salt To a solution of 6.12 g. (10 mm.) of crystalline antibiotic X-537A in 10 ml. dry pyridine was added 2 ml. acetic anhydride. After 2 hours, 10 g. of ice was added to the reaction solution and the resulting mixture was washed into a separatory funnel with ethyl acetate and 1N HCl. The ethyl acetate solution was washed with 1N HCl until all the pyridine had been removed. The ethyl acetate solution was then washed with saturated sodium carbonate solution, dried (Na$_2$SO$_4$) and evaporated to dryness under reduced pressure. The residue was dissolved in methylene chloride and the solution evaporated on the steam bath with additions of hexane until crystallization started. Cooling to 0°, gave 3-methyl-6{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt as white needles, m.p. 186°–187°, $[\alpha]_D^{25}$ −18.75° (1%, CH$_3$OH).

EXAMPLE 4

Sodium Salt of Antibiotic X-537A

The sodium salt was prepared by shaking an ether solution of the free acid of antibiotic X-537A with aqueous sodium carbonate. The salt which remained in the ether was recrystallized twice from benzene-ligroin and dried. It had a melting point, taken in an open capillary tube of 191°–192°C. dec.

EXAMPLE 5

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydropyranyl)-2-tetrahydrofuryl]heptyl} salicylic acid To a cold solution (∼3°) of 6.12 g. of the sodium salt of antibiotic X-537A in 50 ml. of chloroform/3 ml. of carbon tetrachloride was slowly added 34 ml. of carbon tetrachloride saturated with 10 millimoles of chlorine gas. The reaction was continued for one-half hour after which the solution was filtered and the filtrate treated with a saturated aqueous solution of Na$_2$CO$_3$. The solvent layer was dried over Na$_2$SO$_4$ and concentrated to a small volume from which after addition of hexane the crystalline product was recovered. The crystalline material which had a tendency to incorporate the solvent of crystallization was twice recrystallized from methylene chloride/ether and acetone/hexane; m.p. 183°–185°, $[\alpha]_D^{25}$ −44.31° (C, 0.99% CHCl$_3$).

EXAMPLE 6

A 5 ml. parenteral solution was prepared utilizing the following ingredients:

Example 6

A 5 ml. parenteral solution was prepared utilizing the following ingredients:

|  | per ml. |
|---|---|
| Antibiotic X-537A | 5.1 mg. |
| Propylene glycol | 0.5 ml. |
| Anhydrous ethanol | 0.1 ml. |
| Benzyl alcohol | 0.015 ml. |
| Water for injection | q.s. to 1.0 ml. |

Example 7

Tablet Formulation

|  | Per Tablet |
|---|---|
| 3-methyl-6-{7(R)-ethyl-4(S)-hydroxy-3(R), 5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}-salicylic acid | 10 mg. |
| Lactose, USP | 64.5 mg. |
| Corn Starch | 25 mg. |
| Magnesium Stearate | 0.5 mg. |
|  | 100 mg. |

Procedure:

1. The drug was mixed with the lactose, corn starch and magnesium stearate in a suitable mixer.
2. The mixture was further blended by passing through a Fitzpatrick Comminuting machine fitted with a No. 1A screen with knives forward.
3. The mixed powders were slugged on a tablet compressing machine.
4. The slugs were comminuted to a mesh size (No. 16 screen) and mixed well.
5. The tablets were compressed at a tablet weight of 100 mg. using tablet punches having a diameter of approximately ¼ inch. (Tablets may be either flat or biconvex and may be scored if desired.)

3-Methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}-salicylic acid can be replaced in this formulation with the same weight of each of the following:

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid;

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid;

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

Example 8

Tablet Formulation

| | Per Tablet | |
|---|---|---|
| 3-methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl-2(S)-tetrahydrofuryl]heptyl}salicylic acid | 25 | mg. |
| Lactose | 113.5 | mg. |
| Corn Starch | 55.5 | mg. |
| Pregelatinized Corn Starch | 8 | mg. |
| Calcium Stearate | 3 | mg. |
| | 205 | mg. |

Procedure:

1. The drug was mixed with the lactose, corn starch and pregelatinized corn starch in a suitable size mixer.
2. The mix was passed through a Fitzpatrick Comminuting machine fitted with No. 1A screen and with knives forward.
3. The mix was returned to the mixer and moistened with water to a thick paste. The moist mass was passed through a No. 12 screen and the moist granules were dried on paper lined trays at 110°F.
4. The dried granules were returned to the mixer, the calcium stearate was added and mixed well.
5. The granules were compressed at a tablet weight of 200 mg. using standard concave punches having a diameter of 5/16 inch.

3-Methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}-salicylic acid can be replaced in this formulation with the same weight of each of the following:

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid;

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid;

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid;

Example 9

Capsule Formulation

| | Per Capsule | |
|---|---|---|
| 3-methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}salicylic acid | 10 | mg. |
| Lactose | 158 | mg. |
| Corn Starch | 37 | mg. |
| Talc | 5 | mg. |
| | 210 | mg. |

Procedure:

1. The drug was mixed with the lactose and corn starch in a suitable mixer.
2. The mixture was further blended by passing through a Fitzpatrick Comminuting machine with a No. 1A screen with knives forward.
3. The blended power was returned to the mixer, the talc added and blended thoroughly. The mixture was then filled into No. 4 hard-shell gelatin capsules on a capsulating machine.

3-Methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}-salicylic acid can be replaced in this formulation with the same weight of each of the following:

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid;

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid;

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

Example 10

Capsule Formulation

| | Per Capsule | |
|---|---|---|
| 3-methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl-2(S)-tetrahydrofuryl]heptyl}salicylic acid | 50 | mg. |
| Lactose, USP | 125 | mg. |
| Corn Starch, USP | 30 | mg. |
| Talc, USP | 5 | mg. |
| | 210 | mg. |

Procedure:

1. The drug was mixed with lactose and corn starch in a suitable mixer.
2. The mixture was further blended by passing through a Fitzpatrick Comminuting machine with a No. 1A screen with knives forward.
3. The blended powder was returned to the mixer, the talc added and blended thoroughly.
4. The mixture was filled into No. 4 hard-shell gelatin capsules on capsulating machine.

3-Methyl-6-{7(R)-ethyl-4(S)-hydroxy-3(R),5(S)-dimethyl-6-oxo-7-[5(S)-ethyl-3(S)-methyl-5(5(R)-ethyl-5-hydroxy-6(S)-methyl-2(R)-tetrahydropyranyl)-2(S)-tetrahydrofuryl]heptyl}-salicylic acid can be replaced in this formulation with the same weight of each of the following:

3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid;

5-bromo-3-methyl-6-{7-ethyl-4-hydroxy-3,5-dimethyl-6-oxo-7[5-ethyl-3-methyl-5-(5-ethyl-5-hydroxy-6-methyl-2-tetrahydropyranyl)-2-tetrahydrofuryl]heptyl}salicylic acid;

5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl}salicylic acid.

We claim:

1. A method for improving cardiovascular function in a patient requiring such treatment which comprises administering to such patient an effective amount of a compound represented by the formula

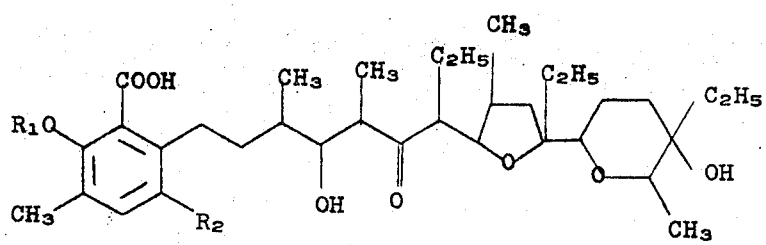

wherein $R_1$ is hydrogen or acetyl; $R_2$ is hydrogen, bromine or chlorine
and the pharmaceutically acceptable salts thereof.

2. The method of claim 1 wherein the compound is 3-methyl-6{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

3. The method of claim 1 wherein the compound is 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl-}salicylic acid.

4. The method of claim 1 wherein the compound is 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid.

5. The method of claim 1 wherein the compound is 5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

6. A parenteral composition for producing myocardial stimulation in patients requiring such effects comprising an inert non-toxic pharmaceutically acceptable parenteral vehicle and an effective amount of an active compound in solution represented by the formula wherein $R_1$ is hydrogen or acetyl; $R_2$ is hydrogen, bromine or chlorine

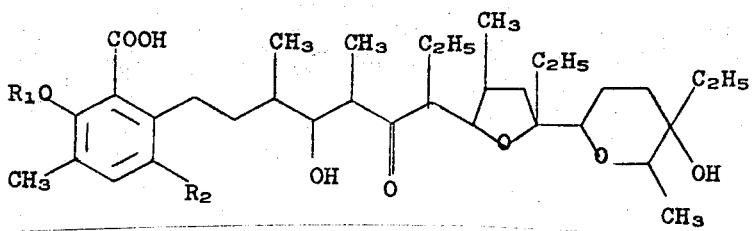

and the pharmaceutically acceptable salts thereof.

7. The composition of claim 6 wherein the active compound is 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

8. The composition of claim 6 wherein the active compound is 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

9. The composition of claim 6 wherein the active compound is 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid.

10. The composition of claim 6 wherein the active compound is 5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid.

* * * * *